(12) United States Patent
Kohno (10) Patent No.: US 7,090,387 B2
(45) Date of Patent: Aug. 15, 2006

(54) BACK LIGHT ILLUMINATING UNIT (76) Inventor: Kazuo Kohno, 332-30 Shitengi, Ohami Shirasato-machi, Sanbu-gun, Chiba-pref. (JP)

( * ) Notice: Subject to any disclaimer, the term of this patent is extended or adjusted under 35 U.S.C. 154(b) by 178 days.

(21) Appl. No.: 10/494,780

(22) PCT Filed: Jan. 27, 2003

(86) PCT No.: PCT/JP03/00700

§ 371 (c)(1),
(2), (4) Date: May 5, 2004

(87) PCT Pub. No.: WO03/065115

PCT Pub. Date: Aug. 7, 2003

(65) Prior Publication Data

US 2005/0047173 A1    Mar. 3, 2005

(30) Foreign Application Priority Data

Jan. 31, 2002   (JP) .............................. 2002-022990

(51) Int. Cl.
*F21V 8/00*      (2006.01)
*F21V 23/00*    (2006.01)
(52) U.S. Cl. .................... 362/561; 362/633; 362/631
(58) Field of Classification Search ............... 362/561, 362/614, 633, 632, 634, 630, 631, 260; 349/65, 349/70
See application file for complete search history.

(56) References Cited

U.S. PATENT DOCUMENTS

| 6,181,391 B1 * | 1/2001 | Okita et al. ................... 349/65 |
| 6,268,694 B1 * | 7/2001 | Fujimoto ..................... 313/491 |
| 6,583,556 B1 * | 6/2003 | Oishi et al. ................. 313/495 |

FOREIGN PATENT DOCUMENTS

| JP | 6-176884 | 6/1994 |
| JP | 7-262815 | 10/1995 |
| JP | 8-29749 | 2/1996 |

* cited by examiner

*Primary Examiner*—Sandra O'Shea
*Assistant Examiner*—Bao Q. Truong
(74) *Attorney, Agent, or Firm*—Wenderoth, Lind & Ponack, L.L.P.

(57) ABSTRACT

A frame disposed on a rear side of a liquid crystal unit has in a front surface sheet thereof an opening almost the size of the liquid crystal unit, and is constituted so that a translucent optical diffusion sheet is tensely provided on the opening in a thin-box-form. An inverter printed board provided with an inverter circuit and a cold cathode are integrally coupled to this frame directly or indirectly via a retainer to unitize the frame, the inverter circuit and the cold cathode. An electrode lead wire of the cold cathode is connected to a high-voltage output terminal of the inverter circuit. A connector for connection to external wiring is fixed to the inverter printed board or the frame to supply electricity to the inverter circuit via the connector and apply high voltage to an electrode of the cold cathode from the inverter circuit.

20 Claims, 15 Drawing Sheets

BACK LIGHT ILLUMINATING UNIT

FIELD OF THE INVENTION

The present invention relates to a backlight illumination unit for use in liquid crystal devices such as personal computers, television sets or car-navigation systems.

BACKGROUND OF ART

In recent years, with regard to liquid crystal display electronic devices such as a personal computer or car-navigation system and the like, liquid crystal display devices with backlights are widely used. As a light source of this backlight, a fluorescent lamp such as a cold cathode fluorescent lamp and the like are used.

Figure 15:
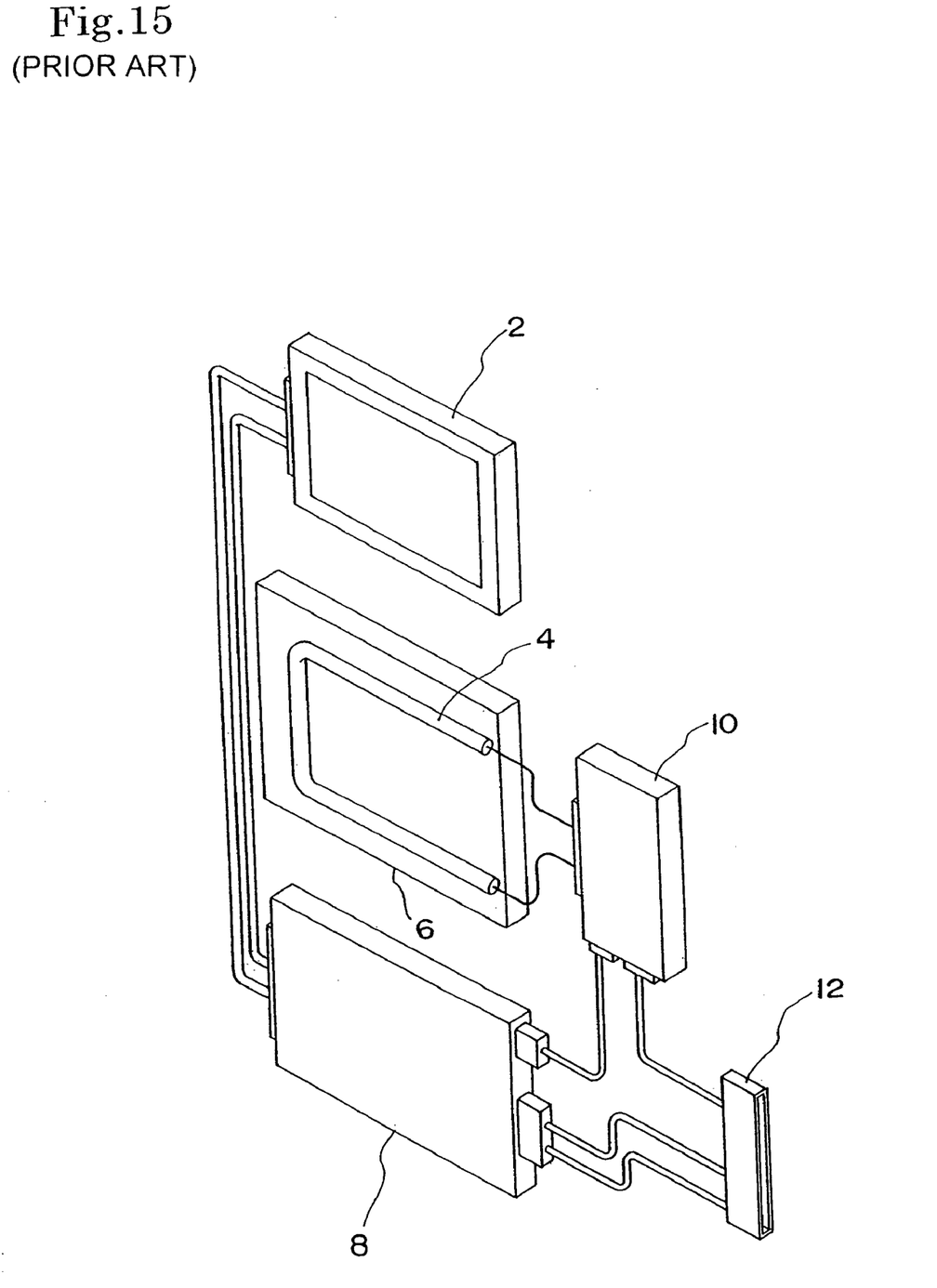
FIG. 15 is an explanatory view of prior art.

The liquid display devices of this kind comprise, as shown in FIG. 15, a liquid crystal unit (2), a lamp unit (6) provided with cold cathode fluorescent lamp (4), liquid crystal control unit (8), inverter unit (10) and connector (12). These devices are electrically connected by virtue of electric cords as shown in this drawing, and are mounted on personal computers or car-navigation systems. The inverter unit (10) is supplied with a power source by virtue of the connector (12), and the liquid crystal control unit (8) is built to input the power source and control signal through the connector (12). Furthermore, a product of an integrally combined liquid crystal unit and liquid crystal control unit has been developed.

When a liquid crystal display device is designed to be of a small size and a thin unit, if a lamp unit and inverter unit are separately built, such a unit is extremely inconvenient, and is not fit to a small size unit of a liquid crystal display device. Moreover, when the lamp unit and the inverter unit are separately built, a high voltage supply electric wire for connection of the inverter unit and the lamp unit tends to become long, and safety is compromised which is a problem.

When the high voltage electric wire becomes longer, electric current leaks due to a floating capacity between grounds which results in a drop of voltage before the voltage reaches a lamp portion. In this case, a problem occurs as a requirement of readjustment of the inverter unit becomes necessary.

An object of the present invention is to solve the foregoing problems.

SUMMARY OF THE INVENTION

This invention comprises a frame disposed behind a liquid crystal unit, a cold cathode tube, and an inverter printed board integrated with an inverter, and is simplified by an integral combination.

The frame is formed of a thin box type, and an aperture portion of a size almost the same as the liquid crystal unit is formed on a surface plate of the frame.

A light diffusion plate of a light permeation type is affixed to the aperture portion of the surface plate of the frame.

The inverter printed board is fixed to a lower surface of a bottom plate of the frame, and the frame is bored with holes.

A lead wire of the cold cathode tube is connected to a high tension output terminal of the inverter circuit through the holes of the frame.

A connector for connection with external wiring is fixed to the inverter printed board, and power is supplied to the inverter circuit through the connector, and high voltage is supplied to electrodes of the cold cathode tube from the inverter circuit.

This invention is so designed that a surface plate of a frame is formed with an aperture portion of a size almost the same as a liquid crystal unit, and a light diffusion plate of a light permeation type is affixed to the aperture portion. The frame formed as a thin box type is disposed behind a rear side of the liquid crystal unit, and is fixed with an inverter printed board provided with an inverter circuit. A cold cathode fluorescent lamp is disposed inside of the frame, and the cold cathode fluorescent lamp is integrally coupled to the frame by virtue of a retainer to form a simple unit of the frame, inverter circuit and cold cathode fluorescent lamp. An acryl plate is disposed inside of the frame in opposition to the cold cathode fluorescent lamp, and a surface of the acryl plate is opposed to the aperture portion of the frame. A lead wire of an electrode of the cold cathode fluorescent lamp is connected to a high voltage output terminal of the inverter circuit, and a connector for connection with external wiring is fixed to the frame or board. Power is supplied to the inverter circuit through the connector, and high voltage is supplied to an electrode of the cold cathode fluorescent lamp from the inverter circuit.

The present invention is so designed that a cold cathode fluorescent lamp is disposed in an inverter printed board provided with an inverter circuit so that the lamp projects to a side of the board, and a retainer plate is fixed to the inverter printed board so that the plate projects to the side of the board. The cold cathode fluorescent lamp is retained to the retainer plate by virtue of a retainer to form a simplified unit of the inverter circuit, cold cathode fluorescent lamp and the retainer plate, and a lead wire of an electrode of the cold cathode fluorescent lamp is connected to a high voltage output terminal of the inverter circuit. A connector for connection to external wiring is fixed to the inverter printed board, and power is supplied to the inverter circuit through the connector. High voltage is supplied to the electrode of the cold cathode fluorescent lamp from the inverter circuit.

The present invention is so designed that an inverter printed board provided with an inverter circuit is fixed to a frame disposed behind a liquid crystal unit, wherein its surface plate is formed of a thin box type and is formed with an aperture portion of a size almost identical to the crystal unit. A light diffusion plate of a light permeation type is affixed to the aperture portion, and a cold cathode fluorescent lamp is disposed inside of the frame. A retainer plate is fixed to the inside of the frame so that it projects to a side of the inverter printed board, and the cold cathode fluorescent lamp is coupled to the retainer plate to form a simple unit of the frame, inverter printed board, cold cathode fluorescent lamp, and retainer plate. The surface plate, of acrylic resin, is disposed to oppose the aperture portion of the frame, and a lead wire of an electrode of the cold cathode fluorescent lamp is connected to a high voltage output terminal of the inverter circuit. A connector for connection to external wiring is fixed to the frame or the inverter printed board, and electric power is supplied to the inverter circuit through the connector. High voltage is supplied to an electrode of the cold cathode fluorescent lamp from the inverter circuit.

Furthermore, the present invention forms a mirror surface for reflection of light of the cold cathode fluorescent lamp on the frame to be directed to the acrylic resin surface plate.

DESCRIPTION OF THE PREFERRED EMBODIMENTS

Embodiments of the present invention will be described in detail in the following by referring to the drawings.

Figure 1:
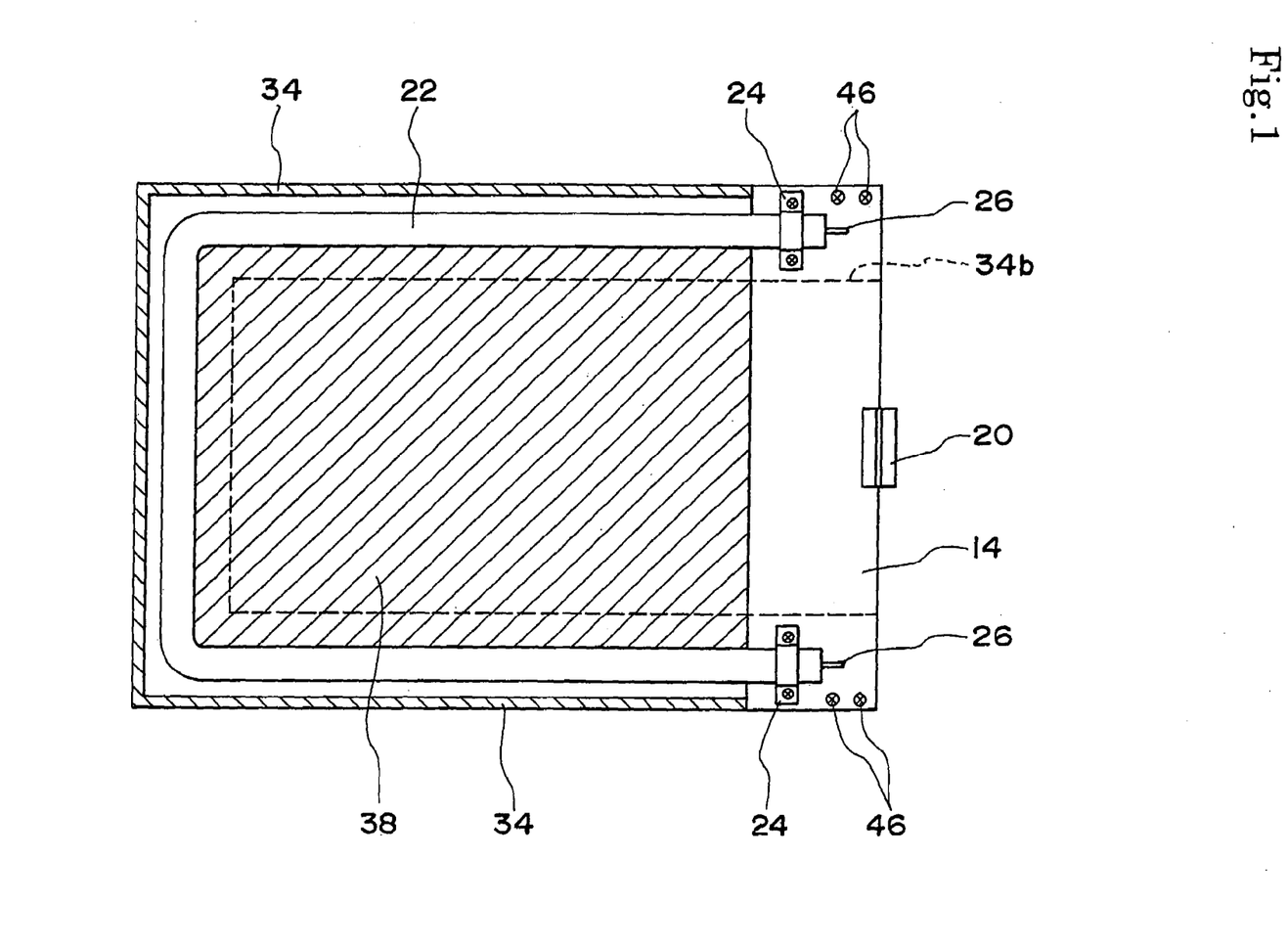
FIG. 1 is an A—A line cross sectional view showing an embodiment of this invention.
Figure 2:
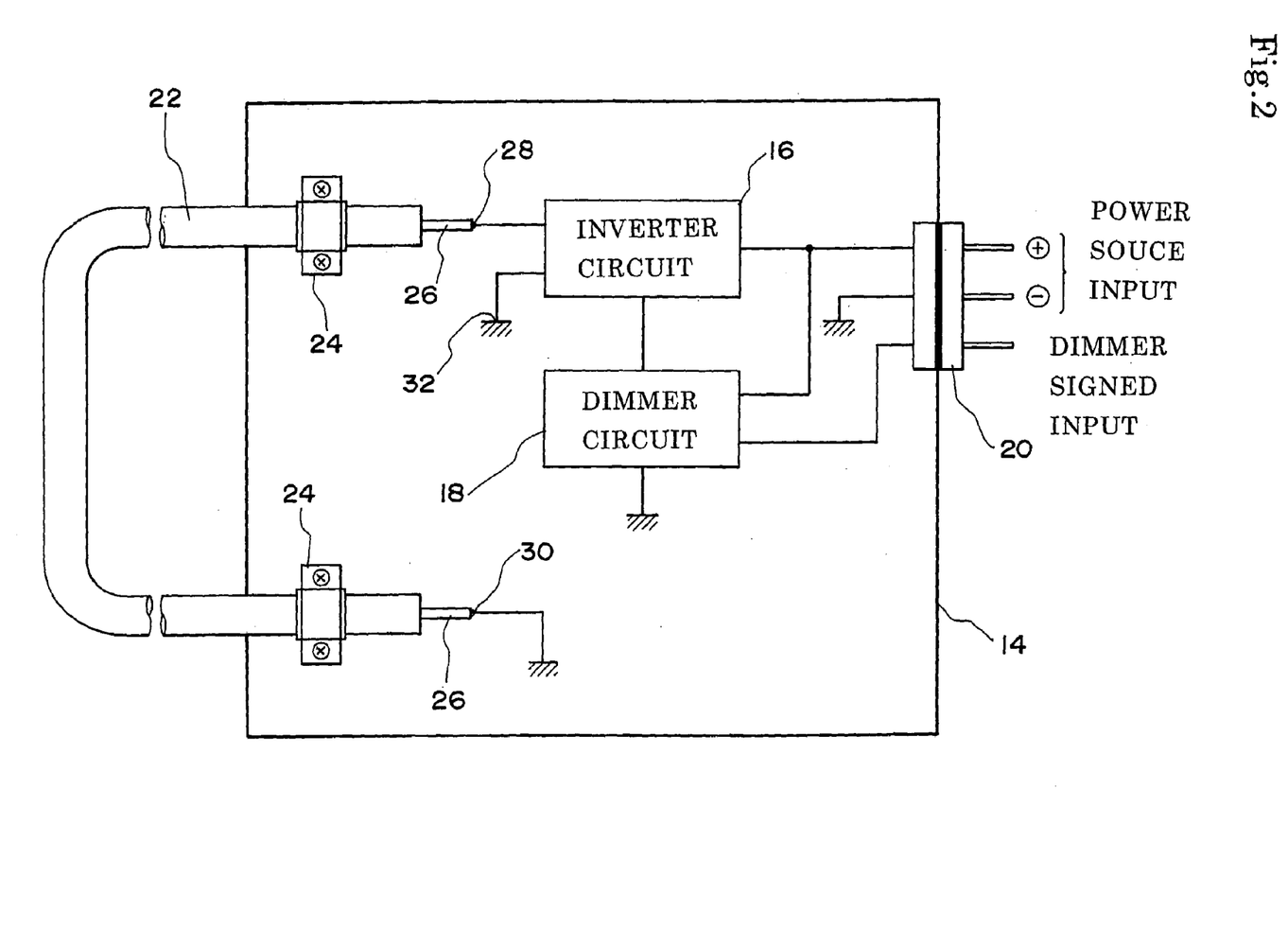
FIG. 2 is an explanatory elevational view showing an embodiment of this invention.
Figure 3:
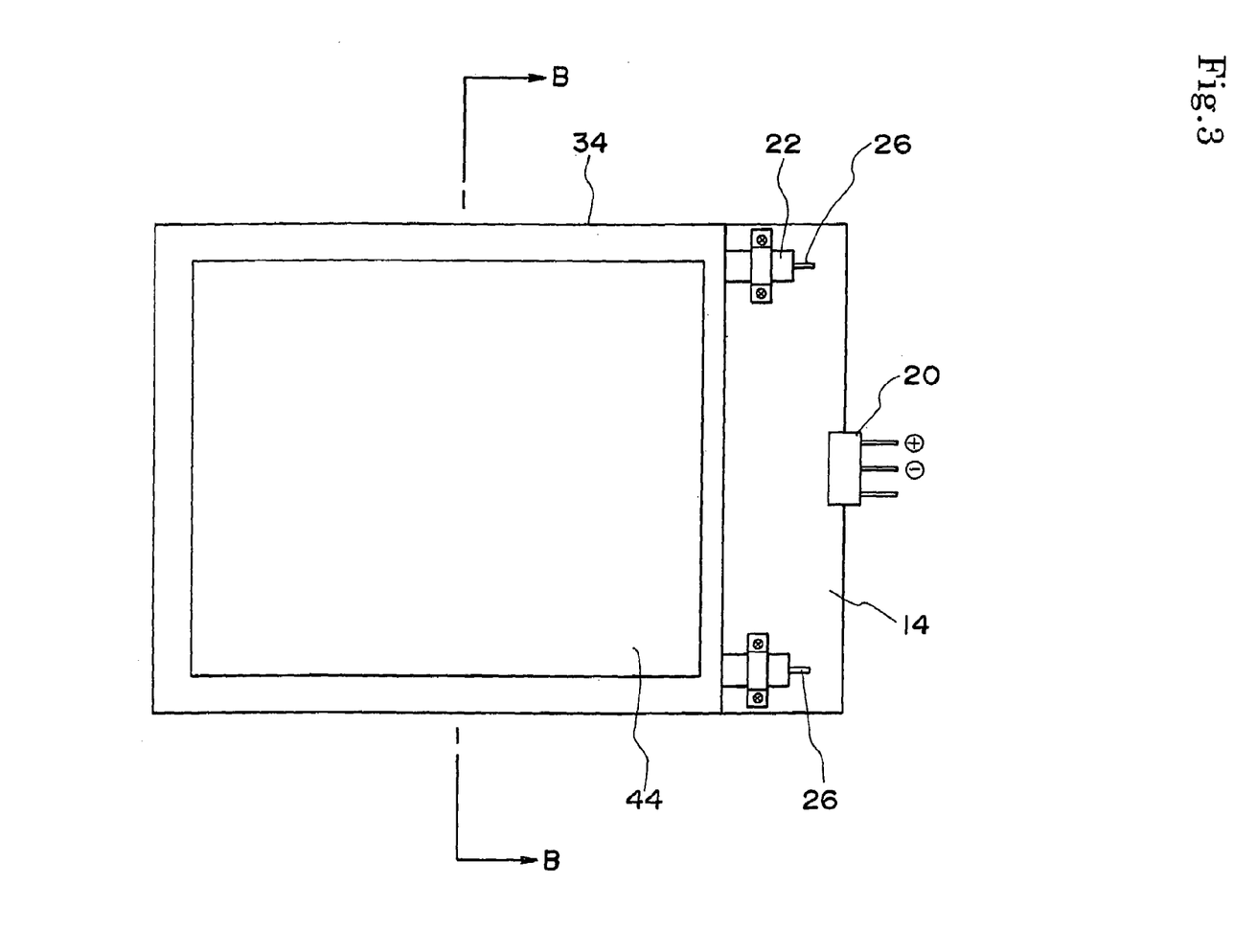
FIG. 3 is an explanatory elevational view showing an embodiment of this invention.

In FIG. 2, numeral (14) shows a printed board comprised of glass epoxy resin and the like, and a high voltage generating circuit including a ceramic piezoelectric transformer or winding transformer, namely, an inverter circuit (16) and dimmer circuit (18) connected to the circuit are formed by print wiring technology.

A connector (20) is fixed to a side of the printed board (14), and two terminals to which power is inputted and one terminal to which a dimmer signal is inputted are provided to an input side of the connector (20). The inverter circuit (16) and the dimmer circuit (18) are connected to the connector (20), and the power is inputted from an exterior through the connector (20).

Figure 4:
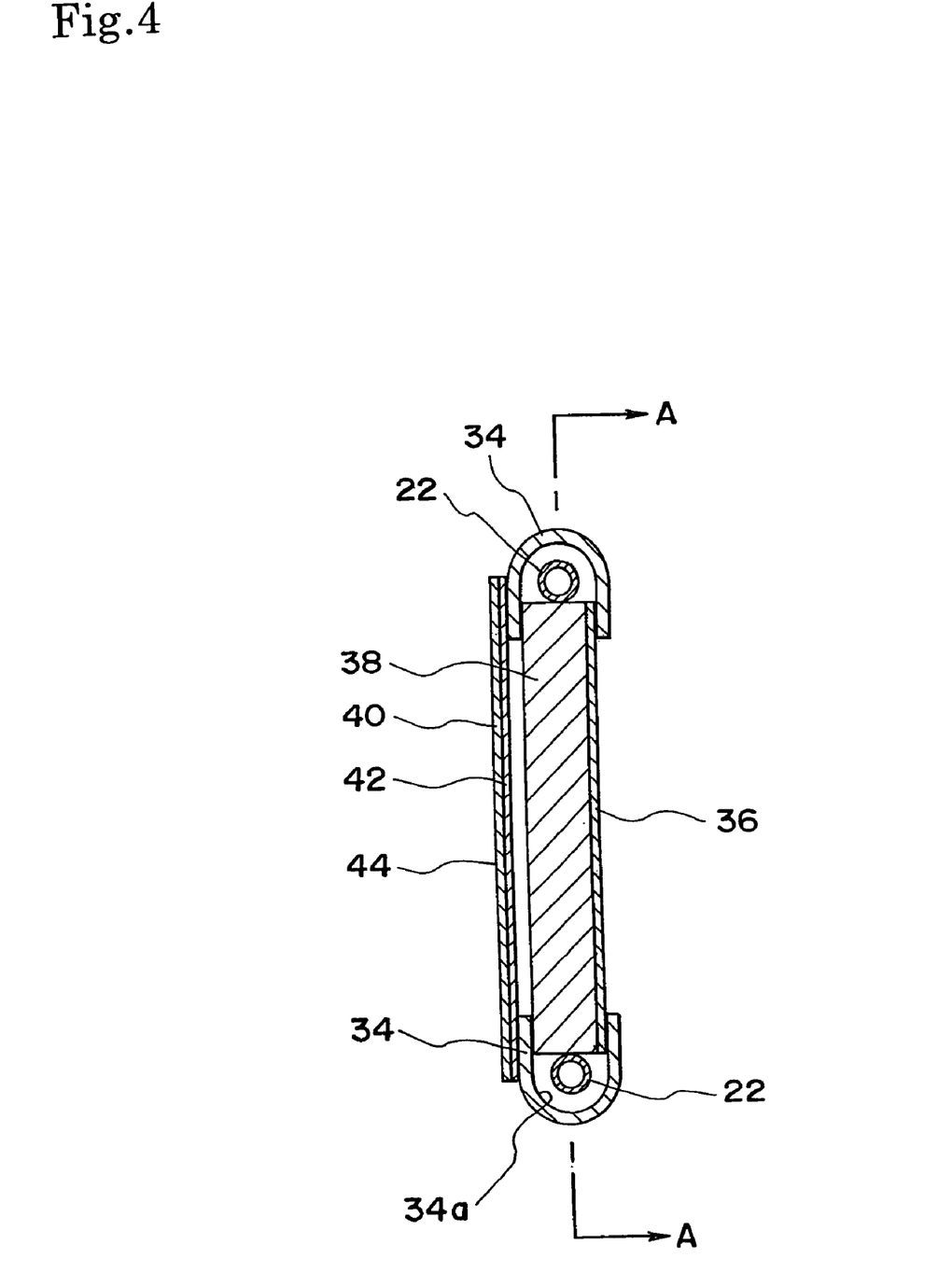
FIG. 4 is a B—B line cross sectional view.
Figure 5:
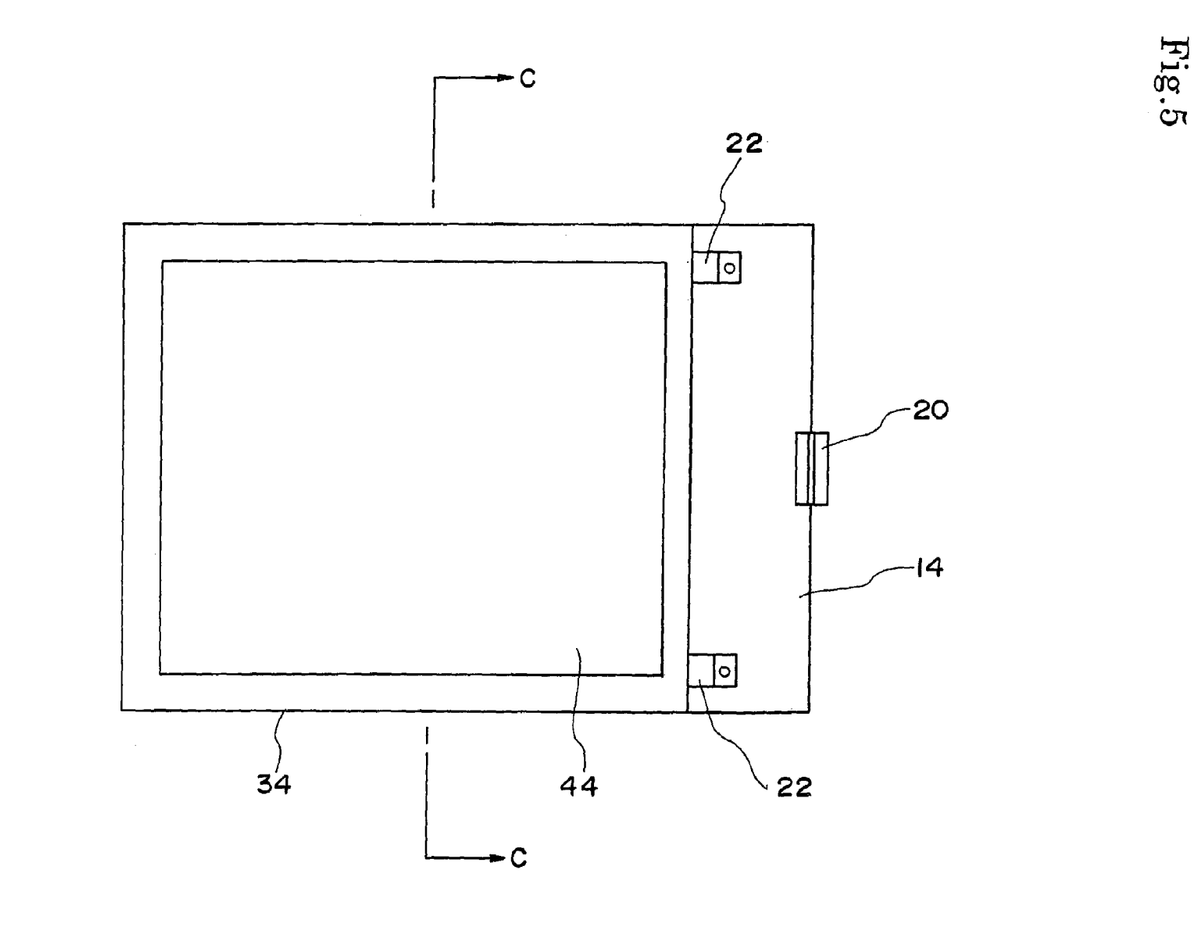
FIG. 5 is a plan elevational view showing another embodiment of this invention.
Figure 6:
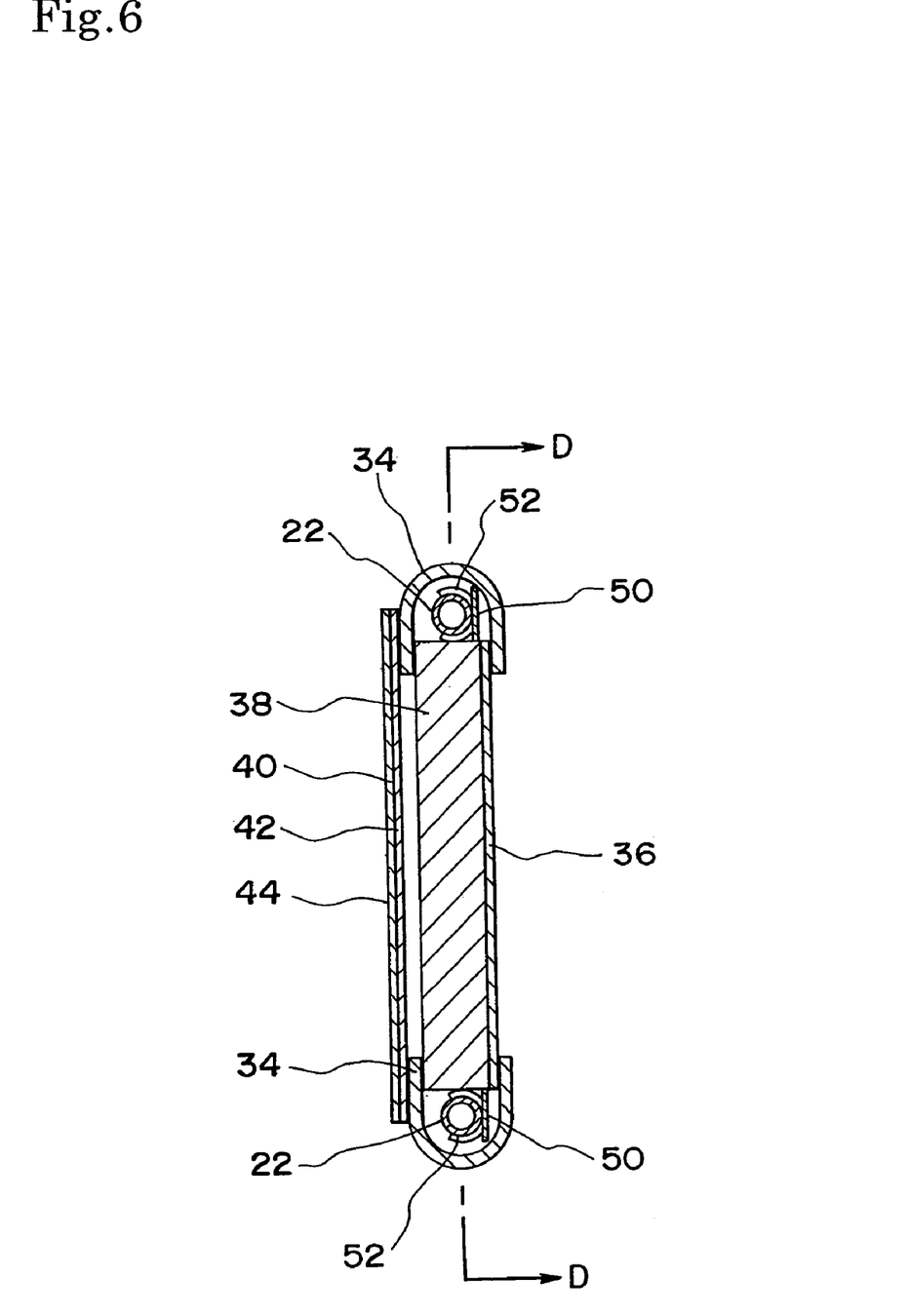
FIG. 6 is a C—C line cross sectional view.

The power and the dimmer signal are inputted to the dimmer circuit (18) through the connector (20). Numeral (22) shows a cold cathode fluorescent lamp (CCFL), that lights with high voltage, which is bent inshape, and both its ends are fixed to the printed board (14) by virtue of retainer metal fittings (24). A lead wire (26) of one electrode of the cold cathode fluorescent lamp is soldered and fixed to a high voltage output terminal (28) of the inverter circuit (16) along a shortest distance, and another lead wire (26) of the cold cathode fluorescent lamp is connected to a ground potential terminal (30) of the printed board (14) by virtue of soldering. By this arrangement, wiring of a high voltage wire between the lead wire (26) of the cold cathode fluorescent lamp (22) and the inverter circuit (16) is no longer needed. Another output terminal (32) of the inverter circuit (16) is connected to ground potential. An illumination unit for backlight is constructed by the printed board (14) and the cold cathode fluorescent lamp (22). The embodiment of the present invention provides the following structure to the foregoing construction. Numeral (34) shows a frame, and a surface plate has an aperture portion of a size almost the same as liquid crystal unit (2) (refer to FIG. 15), and is a thin box type whose side is open. Light diffusion plate of a light permeation type (44) is affixed to the aperture portion of the frame (34) to form a light uniform irradiation surface that irradiates light uniformly. The frame (34) is disposed behind the liquid crystal unit (2), and is fixed to the unit. For this reason, the frame (34) is provided with a fixing member (illustration is omitted) for fixing the frame (34) to the liquid crystal unit (2), and a fixing member (not shown) for fixing the frame (34) to a body of liquid crystal display electronic equipment. As shown in FIG. 4, the cold cathode fluorescent lamp (22) is housed and disposed in a U-shape portion of the frame (34). A light diffusion plate (36) of a light permeation type formed with numerous small delicate convex portions of a pyramid type is fixed and disposed on a rear surface portion of the frame (34), and a back surface open portion of the frame (34) is shielded by the light reflecting diffusion plate (36). A transparent acrylic plate (38) is disposed on an open central portion of the frame (34), and three direction edge portions of the acrylic plate (38) are supported in the U-shape portion of the frame (34). The acrylic plate (38) leads light of the cold cathode fluorescent lamp (22) in a horizontal direction from an end surface side, and a uniform white light irradiated surface is formed on an elevation side of the acrylic plate (38). On an inner surface of the U-shape portion of the frame (34), a mirror surface (34a) reflecting light in an end surface direction of the acrylic plate (38) is formed. On an elevation side open portion of the frame (34), a transparent light diffusion plate (40) and light leading plate (42) are laminated and they are mutually cemented, and thus, a uniform white light irradiated surface is formed, and an open portion of the elevation side of the frame (34) is shielded by this light irradiated surface (44). Only one side each of the light diffusion plate (40) and the light leading plate (42) forming the light irradiated surface (44) are fixed to one side of the U-shape portion of the frame, thereby avoiding a thermal contraction phenomenon thereof. One side portion (34b) of the frame (34) is notched in its upper portion, and this notched end surface opposes one side portion of the printed board (14), and the one side portion (34b) is fixed to the one side portion of the print board (14) by virtue of screws (46). A periphery of the acrylic plate (38) is supported in a holding space of a square type surrounded by an end face of the printed board (14) and the frame (34). In the foregoing construction, the cold cathode fluorescent lamp (22), light diffusion plate (40), light leading plate (42) and acrylic plate (38) are integrally coupled, and as a whole, a thin plate type unit of the backlight device is constructed. This backlight illumination unit is disposed in layers over a back surface of the liquid crystal unit to irradiate the liquid crystal plate. In the foregoing embodiment, the cold cathode fluorescent lamp (22) is fixed directly on the printed board (14) by virtue of the lamp retainer members (24), but the cold cathode fluorescent lamp (22) may be fixed to the frame (34) or as shown in FIGS. 5–9, a lamp retainer plate (50) is provided separately from the frame (34), and the cold cathode fluorescent lamp (22) is retained on the lamp retainer plate (50) by virtue of a fitting type lamp retainer member (52), and the lamp retainer plate (50) may be fixed to the printed board (14) by the screws (46) as another option. In FIG. 6, the cold cathode fluorescent lamp (22) along with the lamp retainer plate (50) are loosely fitted inside of the U-shape portion of the frame (34), and the frame (34) is retained and fixed to the printed board (14) formed with the inverter circuit (16) and the dimmer circuit (18) by virtue of screws (54).

Figure 7:
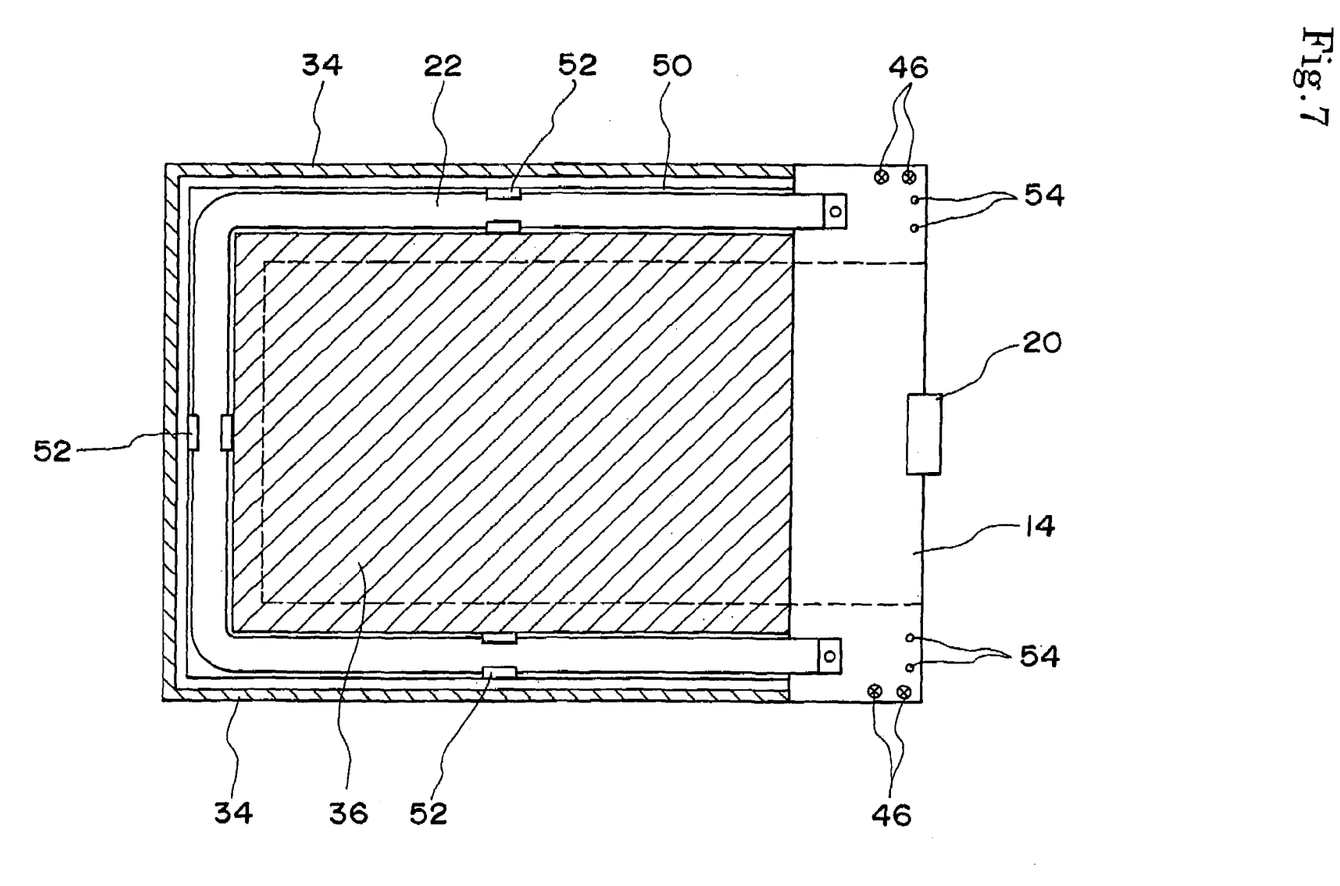
FIG. 7 is a D—D line cross sectional view.
Figure 8:
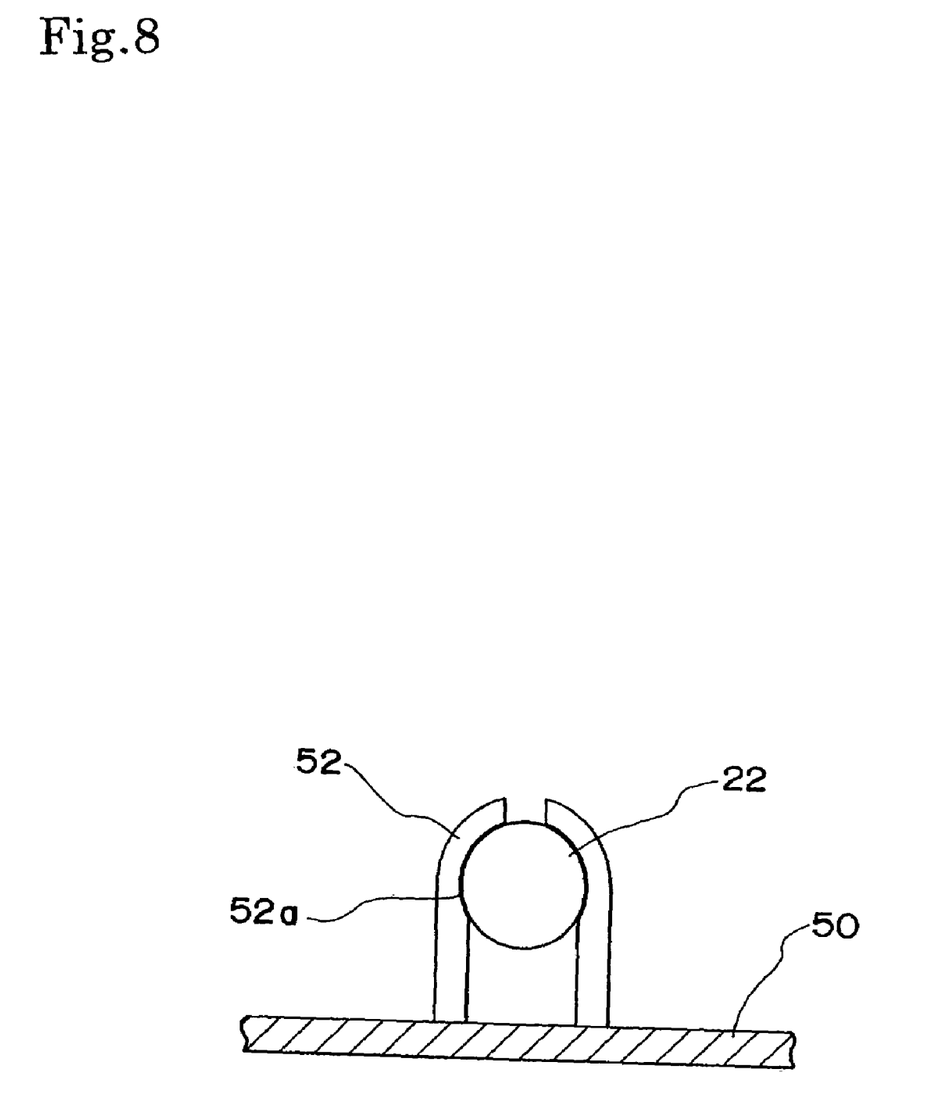
FIG. 8 is an explanatory view of a lamp holding mechanism.
Figure 9:
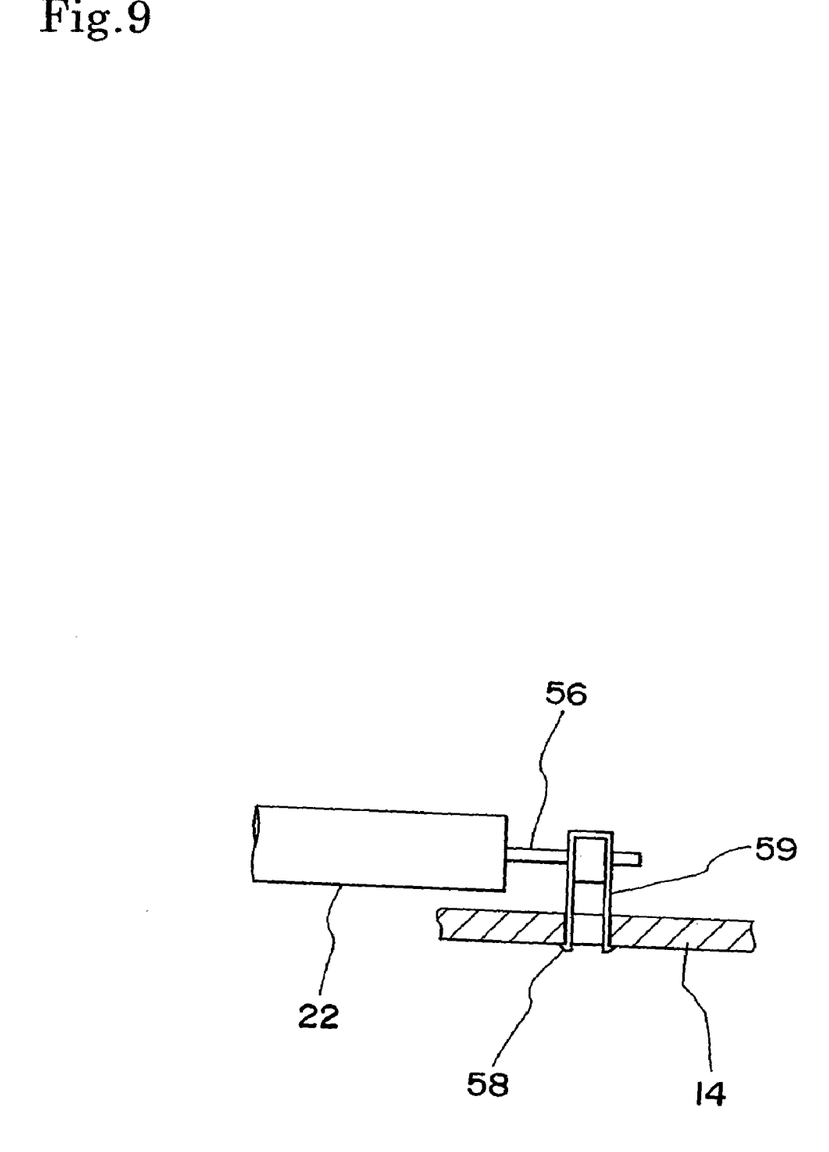
FIG. 9 is a cross sectional view showing a connecting mechanism of a cold cathode fluorescent lamp and printed board.

This embodiment, except for the structure of holding the cold cathode fluorescent lamp (22) by the lamp retainer plate (50), it is identical to the first embodiment. Both ends of the cold cathode fluorescent lamp (22), as shown in 7, are disposed on the printed board (14), and a lead wire (56) of an electrode of one end of the cold cathode fluorescent lamp (22) is, as shown in FIG. 9, connected to a high voltage output terminal (58) of the inverter circuit of the printed board (14) by virtue of metal retainer (59) with soldering, and a lead wire of another electrode is connected to a ground of the printed board (14) by virtue of soldering. The lead wire (56) may be soldered to the high voltage output terminal (58) of the printed board (14) directly without using the metal retainer (59). The lamp retainer member (52) is made of elastic material, and the cold cathode fluorescent lamp (22) is pressure fitted through a gap of an upper portion by resisting elasticity of the retainer member (52) so that a cold cathode fluorescent lamp (52a) may be mounted in a retainer concaved portion (52a).

Figure 10:
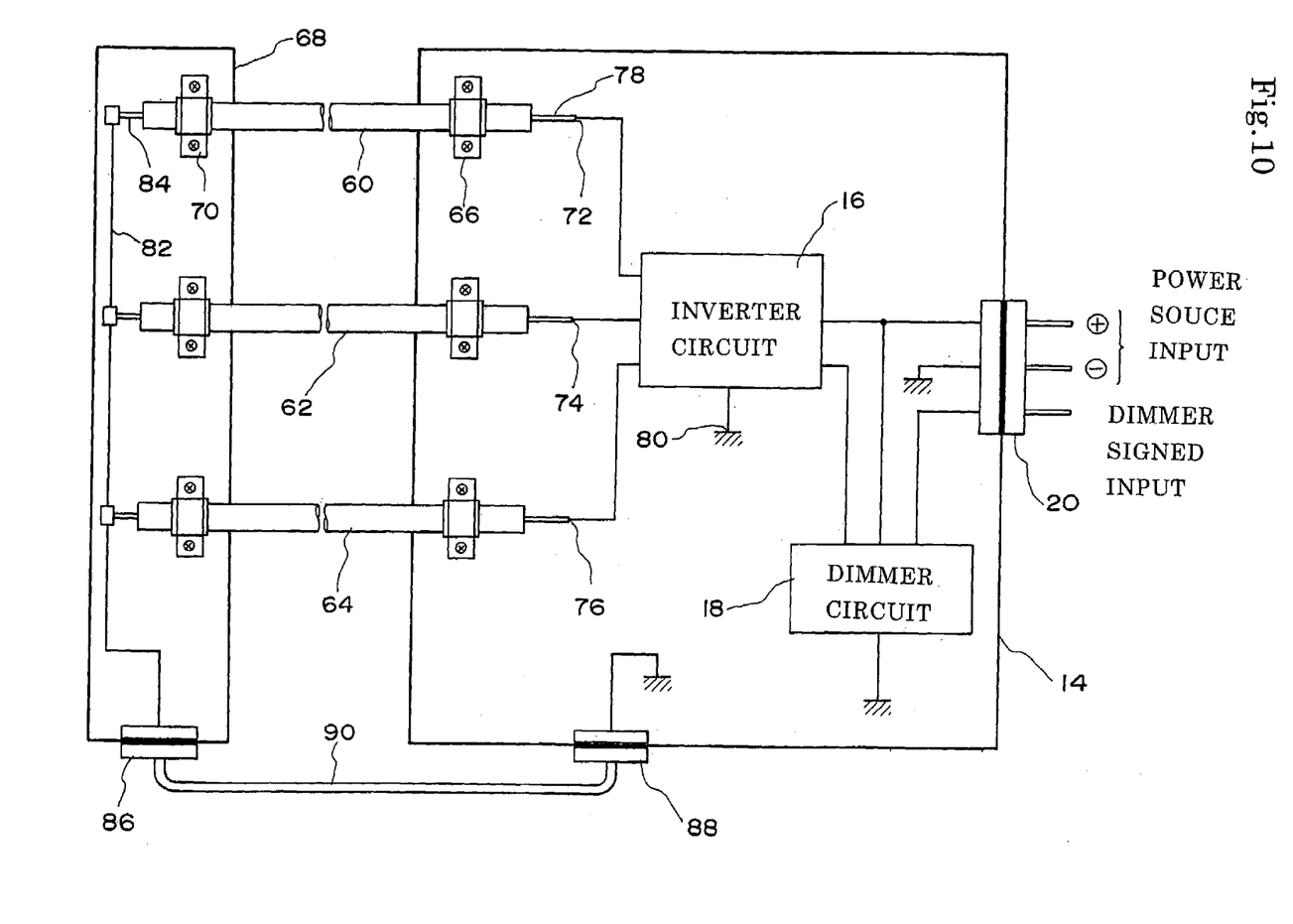
FIG. 10 is an explanatory elevational view showing another embodiment of this invention.

Furthermore, another embodiment of the present invention will be described in the following by referring to FIG. 10.

Numerals (60), (62), (64) show direct pipe type cold cathode fluorescent lamps, and each end portion is fixed to one side of printed board (14) formed with inverter circuit (16) and dimmer circuit (18), and each other end is fixed to a support plate (68) made of a glass epoxy resin plate or the like by virtue of a retainer metal member (70). A lead wire (78) of an electrode of each end of the cold cathode fluorescent lamps (60) (62) (64) is connected with soldering to high voltage output terminals (72) (74) (76) of the inverter circuit (16). An output terminal (80) forming a pair with the high voltage output terminals (72) (74) (76) of the inverter circuit (16) is grounded to the printed board (14). A line (82) made of conductor material is formed on support plate (68), and this line (82) is connected to a lead wire (84) of an electrode of each other end of the cold cathode fluorescent lamps (60) (62) (64) by virtue of soldering. The line (82) is grounded with the printed board (14) through a connector (86) fixed to the support plate (68) and a connector (88) fixed to the printed board (14) and a low voltage cord (90) connecting connectors (86) (88).

In the foregoing construction, an input power is supplied to the inverter circuit (16) through connector (20) fixed to the printed board (14), and the input power and a dimmer signal are inputted to the dimmer circuit (18) by virtue of the connector (20) and lighting, brightness of the cold cathode fluorescent lamps (60) (62) (64), are controlled by the inverter circuit (16).

For reference, a frame disposed behind a rear side of liquid crystal unit (2) is provided wherein an aperture portion of a size almost the same size of the liquid crystal unit is provided on a surface plate and is formed of a thin box type, and a light diffusion plate of a light permeation type is affixed to the aperture portion, and in this frame, a printed board (14), support plate (68), and cold cathode fluorescent lamps (60) (62) (64) are built, and a unit may be formed by the frame, printed board, and cold cathode fluorescent lamps.

Figure 11:
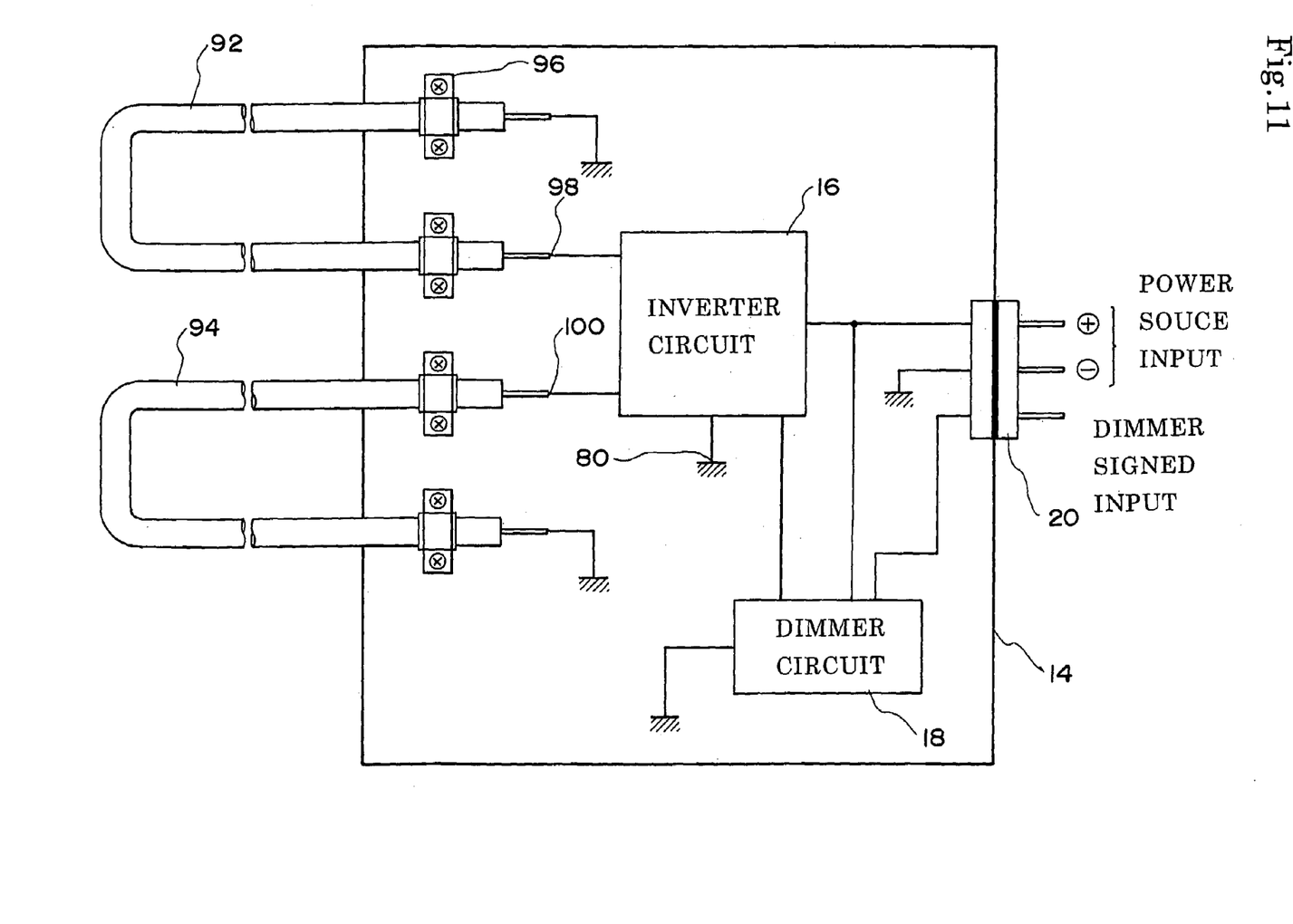
FIG. 11 is an explanatory elevational view showing another embodiment of this invention.

FIG. 11 shows an embodiment wherein both terminals of a plurality of U-shape cold cathode fluorescent lamps (92) (94) are fixed to printed board (14) on which inverter circuit (16) and dimmer circuit (18) are formed by virtue of retainer members (96).

A lead wire of an electrode of one end of the cold cathode fluorescent lamps (92) (94) is connected with soldering to high voltage output terminals (98), (100) of the inverter circuit (16), and an output terminal (80) forming a pair with a high voltage output terminal of the inverter circuit (16) is connected to ground potential. A lead wire of the electrode of another end of the cold cathode fluorescent lamps (92), (94) is connected with soldering to ground potential of the printed board (14). Power is inputted to the inverter circuit (16) by virtue of connector (20), and the power and a dimmer signal are inputted to the dimmer circuit (18) by virtue of the connector (20).

For reference, in this embodiment, similar to the foregoing, a frame is disposed behind liquid crystal unit (2) wherein a surface plate is formed with an aperture portion of a size almost same as the liquid crystal unit (2), and is formed as a thin box, and a light diffusion plate of a light permeation type is affixed to the aperture portion. The printed board (14) and cold cathode fluorescent lamps (92), (94) are built in the frame, and the frame, the printed board and the cold cathode fluorescent lamps may be coupled to form a unit.

Figure 12:
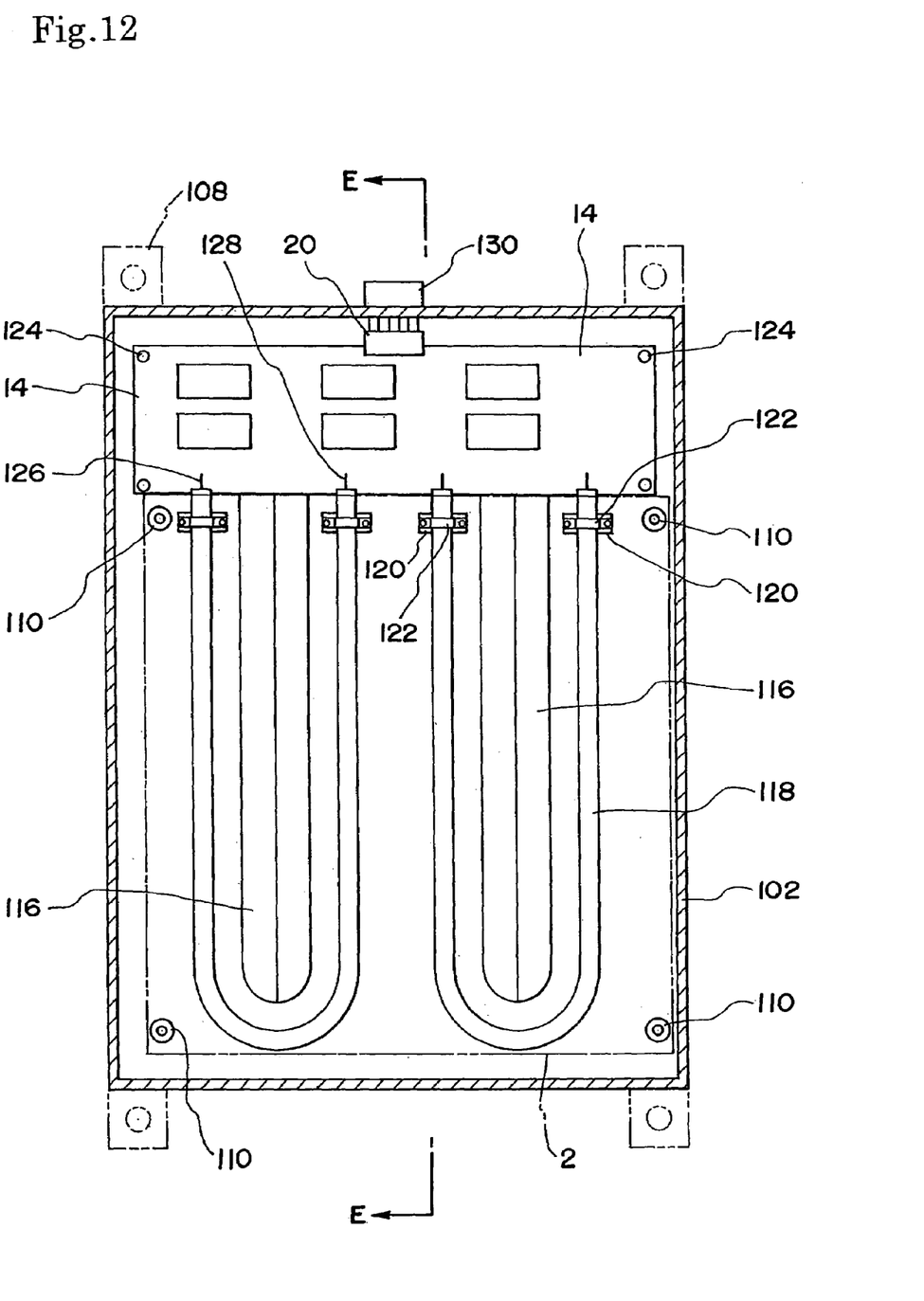
FIG. 12 is an explanatory elevational view showing another embodiment of this invention.
Figure 13:
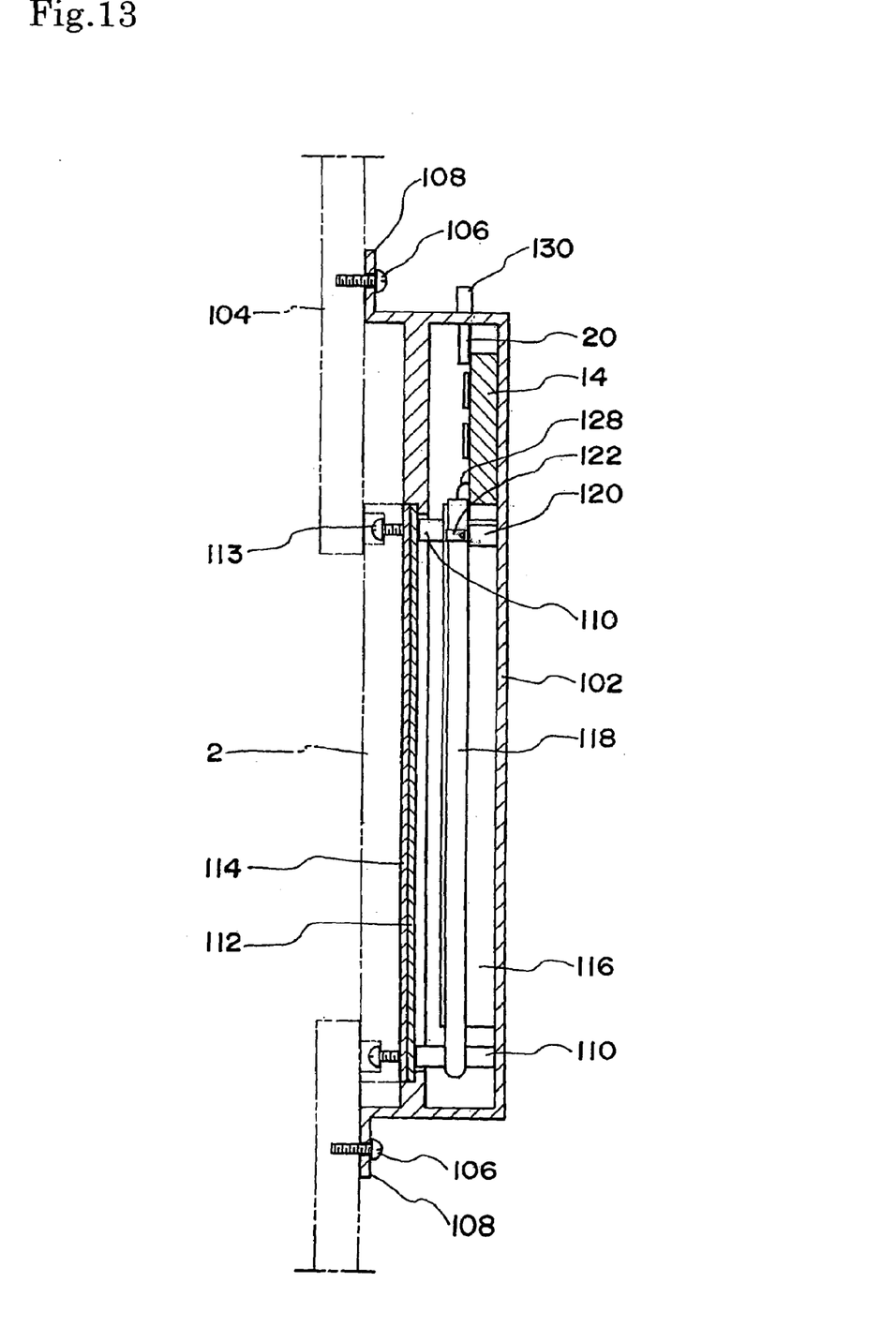
FIG. 13 is an E—E line cross sectional view.

Another embodiment of this invention will be described in the following by referring to FIGS. 12 and 13.

Numeral (102) shows a frame made of metal, plastic or the like wherein a surface plate is formed with an aperture portion, and is formed as a thin box. A fixing member (108) to be fixed by screws (106) to a body (104) of a liquid crystal display electronic unit such as a television or the like, and a fixing member (110) made of a stud for being fixed by a screw (113) to the liquid crystal unit (2), are provided on the frame (102). A light leading plate (112) and a light diffusion plate (114) of a light permeation type are pasted to the aperture portion of the frame (102). The aperture portion forms a light irradiation surface, and the light irradiation surface is set to a size almost equal to that of the liquid crystal unit (2). A light diffusion surface of a light reflection type is formed on a bottom surface of the frame (102), and a light reflection plate (116) of triangular cross section is fixed to the bottom surface. Numeral (118) denotes a cold cathode fluorescent lamp, and is fixed to the bottom surface of the frame (102) by virtue of a holder base (120) and a retainer member (122). Adjacent to an electrode of the cold cathode fluorescent lamp (118), an inverter printed board (14) is fixed to the bottom surface of the frame (102) by virtue of screw (124). A lead wire (126) of one electrode of cold cathode fluorescent lamps (118), (119) is fixed to a high voltage output terminal of the inverter printed board (14) by virtue of soldering, and a lead wire (128) of another electrode of the cold cathode fluorescent lamps (118), (119) is connected to a ground potential terminal of the inverter printed board (14) by virtue of soldering. A connector (130) is fixed to the frame (102), and the connector (130) is connected to connector (20) of the inverter printed board (14).

In the foregoing construction, the frame (102), cold cathode fluorescent lamp (118), and inverter printed board (14) are integrally coupled to form a thin box type unit as a whole, and the unit is mounted on a rear surface of the liquid crystal unit (2) to irradiate a liquid crystal plate of the liquid crystal unit (2).

Figure 14:
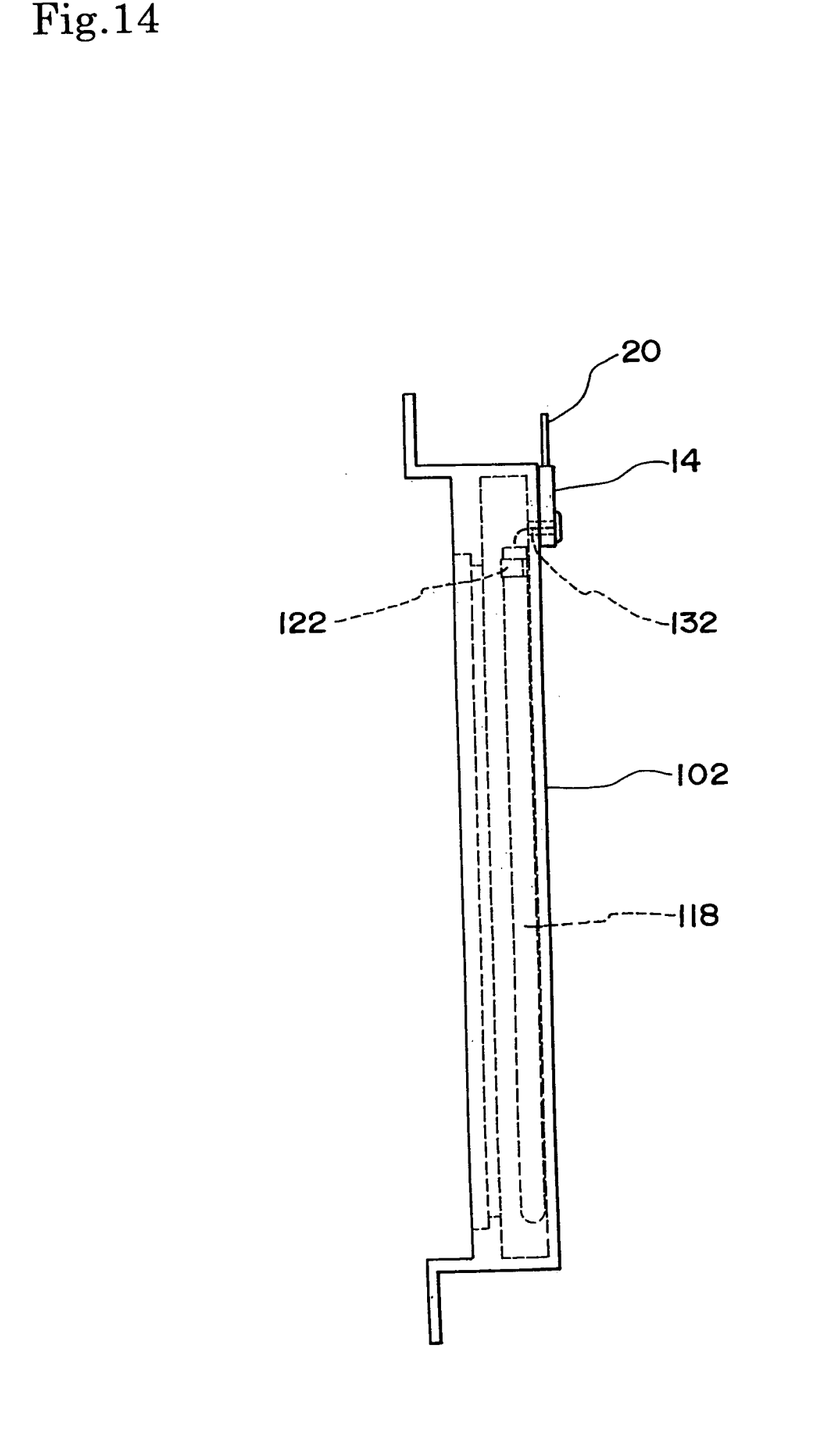
FIG. 14 is an explanatory elevational view showing another embodiment of this invention.

For reference, in the above embodiment, the inverter printed board (14) is disposed inside of the frame (102) by shutting down an exterior but, as shown in FIG. 14, the lead wires (126), (128) of the cold cathode fluorescent lamp (118) built in the frame (102) which is fixed to an outer wall surface of a bottom portion of the frame (102) are led to a through hole of the printed board (14) through a hole (132) bored in the frame (102), and these lead wires may be soldered to the printed board (14).

POSSIBILITY OF USE FOR INDUSTRY

The present invention, as described in the foregoing, provides a unit of cold cathode fluorescent lamps and an inverter printed circuit board by coupling, and this unit leads to a possibility of materializing a smaller and thinner model of an entire unit of a backlight, and yet, use of a high voltage wire is not needed. Because the use of high voltage wire is not needed, safety is provided, and reliability of operation is realized, by the present invention.

What is claimed is:

1. A backlight illumination unit comprising:
   a frame to be disposed behind a liquid crystal unit, said frame including
      (i) a surface plate defining an aperture almost equal in size to a size of the liquid crystal unit, and
      (ii) a bottom plate;
   a light permeation plate fixed over said aperture;
   a cold cathode tube in said frame, said cold cathode tube including an electrode having a lead wire;
   a printed board fixed to an outer surface of said frame and provided with an inverter circuit having a high voltage output terminal connected to said lead wire; and
   a connector for being connected with external wiring so as to allow power to be supplied to said inverter circuit via said connector such that high voltage can be supplied from said inverter circuit to said electrode via said high voltage output terminal and said lead wire,
   wherein said frame, said cold cathode tube and said printed board are integrally coupled to form a unit.

2. The backlight illumination unit according to claim 1, wherein
   said printed board is fixed to an outer surface of said frame by being fixed to a lower surface of said bottom plate.

3. The backlight illumination unit according to claim 2, wherein
   said frame also includes a hole in a surface of said frame, and
   said high voltage output terminal is connected to said lead wire by virtue of said lead wire passing through said hole.

4. The backlight illumination unit according to claim 3, wherein said frame comprises a thin box-type frame.

5. The backlight illumination unit according to claim 4, wherein said light permeation plate comprises a light transmission plate.

6. The backlight illumination unit according to claim 5, wherein said connector is fixed to said printed board.

7. The backlight illumination unit according to claim 1, wherein
   said frame also includes a hole in a surface of said frame, and
   said high voltage output terminal is connected to said lead wire by virtue of said lead wire passing through said hole.

8. The backlight illumination unit according to claim 7, wherein said frame comprises a thin box-type frame.

9. The backlight illumination unit according to claim 8, wherein said light permeation plate comprises a light transmission plate.

10. The backlight illumination unit according to claim 9, wherein said connector is fixed to said printed board.

11. The backlight illumination unit according to claim 7, wherein said light permeation plate comprises a light transmission plate.

12. The backlight illumination unit according to claim 7, wherein said connector is fixed to said printed board.

13. The backlight illumination unit according to claim 2, wherein said frame comprises a thin box-type frame.

14. The backlight illumination unit according to claim 2, wherein said light permeation plate comprises a light transmission plate.

15. The backlight illumination unit according to claim 2, wherein said connector is fixed to said printed board.

16. The backlight illumination unit according to claim 1, wherein said frame comprises a thin box-type frame.

17. The backlight illumination unit according to claim 16, wherein said light permeation plate comprises a light transmission plate.

18. The backlight illumination unit according to claim 17, wherein said connector is fixed to said printed board.

19. The backlight illumination unit according to claim 1, wherein said light permeation plate comprises a light transmission plate.

20. The backlight illumination unit according to claim 1, wherein said connector is fixed to said printed board.

* * * * *